Aug. 21, 1962     W. MÖLLER     3,050,671
VARIABLE-SPEED MOTOR
Filed Sept. 21, 1959
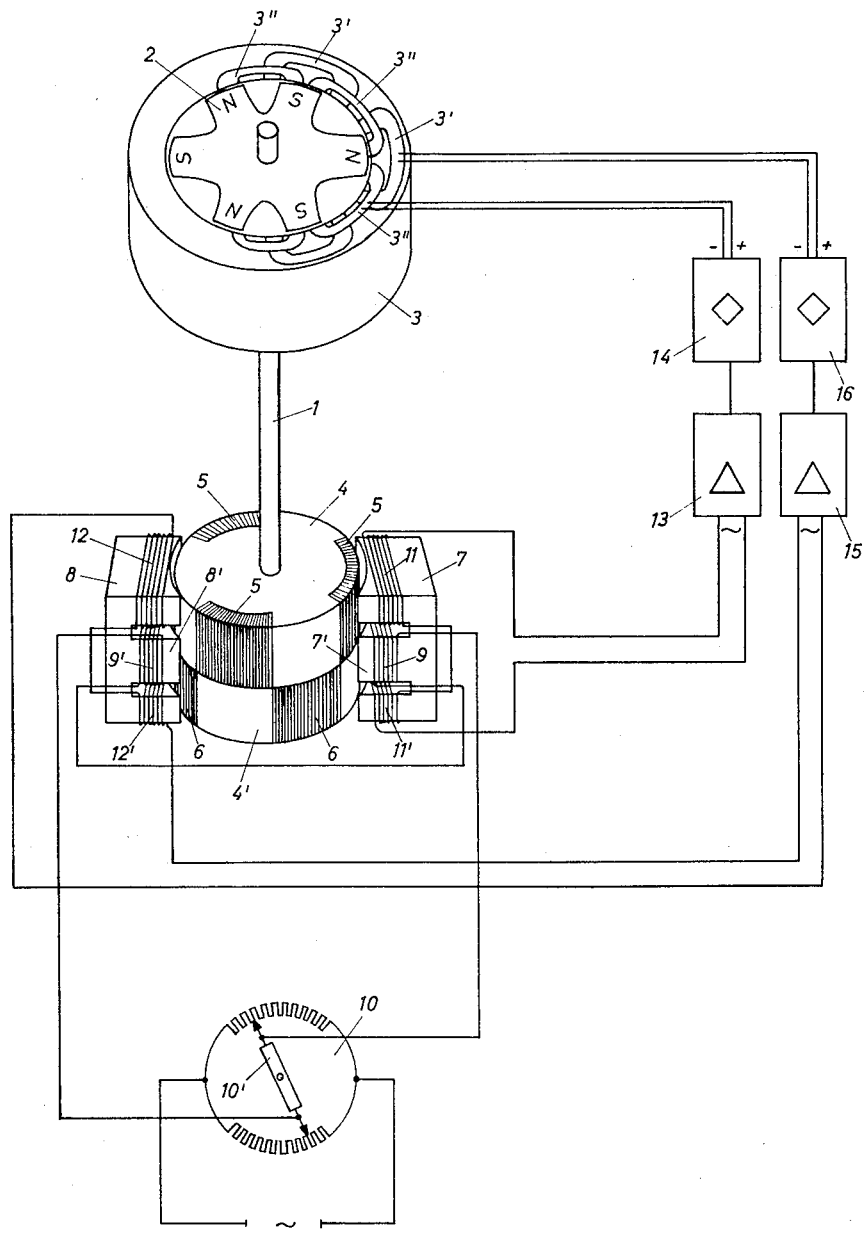
INVENTOR.
WALDEMAR MÖLLER
BY United States Patent Office 3,050,671
Patented Aug. 21, 1962

3,050,671
VARIABLE-SPEED MOTOR
Waldemar Möller, Ueberlingen (Bodensee), Germany, assignor to Bodenseewerk Perkin-Elmer u. Co. G.m.b.H., Askania Weg, Ueberlingen (Bodensee), Germany
Filed Sept. 21, 1959, Ser. No. 841,272
Claims priority, application Germany Sept. 24, 1958
5 Claims. (Cl. 318—171)

This invention relates to a variable-speed electric motor for use as a servomotor in regulating and control systems. It is essential that the direction of rotation and speed of such motors can be easily varied. Ferraris motors have therefore been often used for this purpose because these motors can be very easily controlled. Unfortunately, however, such motors have poor efficiency and poor torque characteristics.

The object of this invention is to provide an electric motor which can be simply and accurately controlled with respect to direction and speed of rotation and which has a relatively high efficiency and a suitable torque characteristic.

According to the invention, this object is accomplished by generating a revolving stator field by two induction systems controlled by means of the rotor shaft. The two systems are out of phase by 90 degrees and hold the revolving field vectors on the central line between two rotor poles. The magnitude and the polarity of the revolving field vectors are determined by the excitation of the induction systems. It is thus possible, by varying the excitation of these induction systems, to vary the direction and speed of rotation of the revolving field. For this purpose, the excitation windings of the two induction systems are in the circuit of an adjustable A.C. Wheatstone bridge. The phase and amplitude of the excitation voltage can be controlled by adjusting the bridge. It is possible, with the arrangement conceived and constructed according to the invention, to connect each induction coil of the induction systems through demodulating phase sensitive rectifiers and, if necessary, through amplifiers to one winding system of the stator.

An embodiment of the invention is schematically illustrated in the accompanying drawings and more fully explained in the following detailed description.

A star shaped magnet rotor 2 which has alternatingly arranged north and south magnetic poles (N.S.) is mounted on the motor shaft 1. The magnetic rotor 2 rotates inside a stator 3 which comprises two winding systems 3', 3" which are staggered relative to each other by half a rotor pole pitch in the direction of rotation.

A control cylinder consisting of two parts 4, 4' is also mounted on the motor shaft 1. The parts 4, 4' of the control cylinder comprise lamellar iron segments 5 and 6 which are offset relative to each other in the direction of rotation and which are embedded in insulation. Two E-shaped induction systems 7, 8 cooperate with the two-part control cylinder 4, 4'. Each of these systems (7, 8) carries on its central web 7' or 8', respectively, an excitation winding 9, 9'. The two excitation windings 9, 9' are connected in series in the diagonal of a Wheatstone bridge 10 acting as a control signal transmitter and supplied with an alternating voltage. By means of a tap 10', which is adjustable in accordance with a control signal, it is possible to unbalance bridge 10 and vary the phase and amplitude of the control voltages impressed across the excitation windings.

Induction coils 11, 11' and 12, 12' which are connected in opposition to each other are mounted on the outer legs of the induction systems 7, 8. The coils 11, 11' of the system 7 are connected via an amplifier 13 and a demodulating phase sensitive rectifier 14 to the winding system 3" of the stator 3. The induction coils 12, 12' of the other system (8) are in like manner connected through an amplifier 15 and a phase sensitive rectifier 16 to the other winding system (3') of the stator 3.

The central web 7' or 8', respectively, of the induction systems 7, 8 lies within the reach of both control cylinder parts 4, 4', while each of the outer legs is only arranged within the reach of one of the control cylinder parts 4, 4'. Upon any rotation of the motor shaft 1 and the control cylinder (4, 4') connected therewith, the magnetic circuit of each of the induction systems 7, 8 is alternatingly closed by means of an iron segment 5 via the upper web, and by means of an iron segment 6 via the lower web, so that voltages corresponding to the excitation are alternately induced in coils 11, 12 and in coils 11', 12'. In this manner, a revolving field is generated in the stator 3. The direction and the intensity of this revolving field is easily controllable by adjusting the signal transmitter 10'. If the control cylinder parts 4, 4' are properly adjusted with respect to the rotor 2, the vectors of the revolving field may be made to lie on the center line between the north and south magnetic rotor poles. The rotor 2 will then follow the revolving field in both directions of rotation. The direction of the rotating field is determined by the phase of the exciting alternating voltage and is dependent on the position of the signal transmitter 10' and the phase sensitive rectifier (14, 16).

I claim:
1. In a variable-speed two phase electric motor having a stator producing a rotating magnetic field and a rotor including a plurality of pairs of magnetic poles, the improvement which comprises:
   a cylindrical member driven by said rotor, rotatable about its axis of revolution and having first and second regions adjoining along a line formed by the intersection of the cylindrical surface with a plane perpendicular to said axis of revolution, each of said first and second regions comprising surface areas of magnetically permeable material alternating with magnetically impermeable material, each area of said first region adjoining a dissimilar area of said second region; and
   a first and a second variable induction system means in energizing relationship, respectively, to first and second windings of said stator, each of said induction system means comprising a transformer having a substantially E-shaped core adjoining said cylindrical member and positioned such that the magnetically permeable areas of said first region magnetically link the center leg of said E to one outside leg and the magnetically permeable areas of said second region magnetically link the center leg of the E to the other outside leg.

2. In a variable-speed two phase electric motor having a stator producing a rotating magnetic field and a rotor including a plurality of pairs of magnetic poles rotatable therein, the improvement which comprises first and second induction system means in energizing relationship, respectively, to first and second windings of said stator, the energizing windings of said first and second induction system means being series connected to a voltage supply means comprising first and second parallel-connected impedances connectable to an alternating voltage, a moveable first pickoff adapted to move along the first impedance and electrically connected to the energizing winding of said first induction system, and a moveable second pickoff adapted to move along the second impedance and electrically connected to the energizing winding of said second induction system.

3. In a variable-speed polyphase electric motor, the improvement comprising:
   a rotatable control member driven by said motor and having first and second regions adjoining along a line formed by the intersection of a cylindrical surface coaxial with the axis of rotation of said control member and a plane perpendicular to said axis, each of said first and second regions comprising alternating surface areas of magnetically permeable material and magnetically impermeable material, each area of said first region substantially adjoining a dissimilar area of said second region; and first and second variable induction system means in energizing relationship, respectively, to first and second armature windings of said motor, each of said induction system means comprising a transformer having a substantially E-shaped core adjoining said control member and so positioned that the magnetically permeable areas of said first region magnetically link the center leg of said E to one outside leg and the magnetically permeable areas of said second region magnetically link the center leg of the E to the other outside leg.

4. In a variable-speed reversible electric motor including a stator producing a rotating magnetic field and a rotor having a plurality of magnetic poles rotating therein, the improvement which comprises field generating means driven by said rotor adapted to maintain the resultant field vectors of said stator spatially oriented substantially intermediate adjacent rotor poles and further adapted to vary the magnitude and polarity of said vectors.

5. The motor of claim 4 wherein said field generating means comprises first and second field producing means alternately energized by activating means driven by said rotor.

References Cited in the file of this patent

UNITED STATES PATENTS

| | | |
|---|---|---|
| 2,719,944 | Brailsford | Oct. 4, 1955 |
| 2,797,376 | Meade | June 25, 1957 |